United States Patent
Noguchi et al.

(10) Patent No.: US 7,215,775 B2
(45) Date of Patent: May 8, 2007

(54) AD-HOC RADIO COMMUNICATION VERIFICATION SYSTEM

(75) Inventors: Tetsuya Noguchi, Yokohama (JP); Susumu Shimotono, Hadano (JP)

(73) Assignee: Lenovo Singapore Pte. Ltd, Singapore (SG)

( * ) Notice: Subject to any disclaimer, the term of this patent is extended or adjusted under 35 U.S.C. 154(b) by 779 days.

(21) Appl. No.: 09/884,672

(22) Filed: Jun. 19, 2001

(65) Prior Publication Data

US 2002/0023216 A1 Feb. 21, 2002

(30) Foreign Application Priority Data

Jun. 20, 2000 (JP) .............................. 2000-184697

(51) Int. Cl.
- H04K 1/00 (2006.01)
- H04L 9/00 (2006.01)
- H04M 1/66 (2006.01)

(52) U.S. Cl. ...................... 380/249; 380/283; 455/411

(58) Field of Classification Search ................ 380/277, 380/278, 283, 284, 262, 247, 249, 250, 270, 380/271, 272; 713/170; 455/411

See application file for complete search history.

(56) References Cited

U.S. PATENT DOCUMENTS

| | | | | |
|---|---|---|---|---|
| 5,225,664 A | * | 7/1993 | Iijima | ......................... 235/380 |
| 5,909,491 A | * | 6/1999 | Luo | ............................ 380/270 |
| 6,772,331 B1 | * | 8/2004 | Hind et al. | .................. 713/151 |
| 6,775,770 B1 | * | 8/2004 | Davis et al. | ................. 713/156 |
| 6,886,095 B1 | * | 4/2005 | Hind et al. | .................. 713/168 |
| 2001/0013890 A1 | * | 8/2001 | Narayanaswami | ....... 348/14.01 |
| 2002/0038392 A1 | * | 3/2002 | De La Huerga | ............... 710/8 |

FOREIGN PATENT DOCUMENTS

| | | | |
|---|---|---|---|
| EP | 0809379 | * | 11/1997 |
| EP | 0919945 | * | 6/1999 |

OTHER PUBLICATIONS

Vainio (Juha T. Vainio, "Bluetooth Security"); http://www.niksula.cs.hut.fi/~jiitv/bluesec.html.*

(Continued)

Primary Examiner—Kambiz Zand
Assistant Examiner—Peter Poltorak
(74) Attorney, Agent, or Firm—Anne Vachon Doughert; Carlos Munoz-Bustamante

(57) ABSTRACT

An aspect of the present invention is to easily verify data integrity in data transmission and reception by means of an ad-hoc radio connection. A requester and requested end of an establishment of a cipher communication path are defined as source A and destination B, respectively. A predetermined verification data generation algorithm ID1 is arranged in advance between source A and destination B. Source A sends its own public key Kp to destination B, and at the same time generates verification data Xp based on Kp using ID1 and outputs Xp to its own verification image display section. On the other hand, destination B receives data Kx that is transmitted from source A as Kp, then generates verification data Xx based on Kx using ID1 and outputs Xx to its own verification image display section. A verifier determines that data integrity is secured if Xp and Xx displayed in the verification image display sections of source A and destination B match.

17 Claims, 9 Drawing Sheets

OTHER PUBLICATIONS

Schneier (Bruce Schneier, "Applied Cryptography, Protocols, Algorithms and Source Code in C", 2nd edition, 1996 ISBN: 0471128457).*

Flanagan (David Flanagan, "Java in a Nutshell", 3rd Edition, 1999, ISBN: 1565924878), p. 22 and 26.*

Schneier (Bruce Schneier, "Applied Cryptography, Protocols, Algorithms and Source Code in C", 2nd edition, 1996 ISBN: 0471128457), p. 351-353.*

Schneier (Bruce Schneier, "Applied Cryptography, Protocols, Algorithms and Source Code in C", 2nd edition, 1996 ISBN: 0471128457), p. 433-438.*

* cited by examiner (a)
(b)
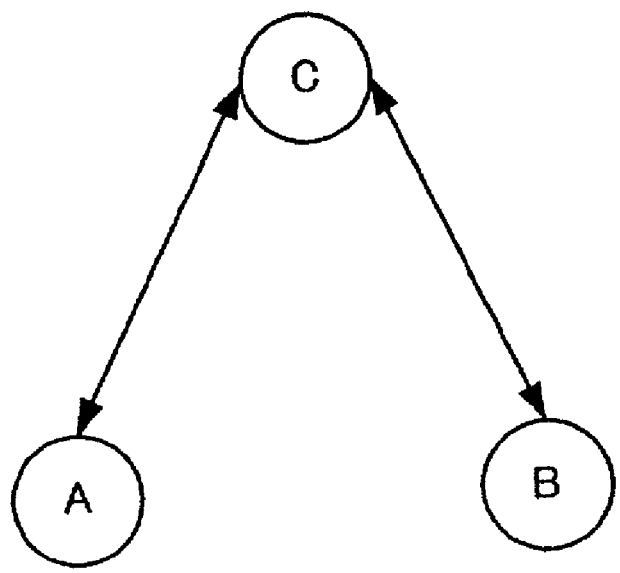
Fig. 1

AD-HOC RADIO COMMUNICATION VERIFICATION SYSTEM

FIELD OF THE INVENTION

The present invention relates to an ad-hoc radio communication verification system, ad-hoc radio communication data send/receive system, ad-hoc radio communication verification method, ad-hoc radio communication data send/receive method for coping with tampering of transmission data, and further a recording medium and delivery apparatus for recording and delivering a corresponding program, respectively.

BACKGROUND

In order for two unspecified parties to transmit data without having the data tampered with by a malicious third party in an ad-hoc short-haul radio communication such as ad-hoc radio communication that does not utilize a specific infrastructure, it is necessary to share a cipher key that is unknown to the malicious third party. However, a method for properly setting a value behind the cipher key during communication is complicated, therefore, particularly under the circumstance where communicating parties meet for the first time, it is impractical that they exchange the cipher key by parol or memo writing. One method for automatically sharing a cipher key is to share a public key first and then encrypt the cipher key using that public key to share. However, there is a risk of Man-in-the-middle attack (For details on Man-in-the-middle attack, refer to the publication titled "APPLIED CRYPTOGRAPHY", John Wiley & Sons, Inc., pages 48–50, by Bruce Schneier).

Now the risk of data tampering in the Man-in-the-middle attack will be summarized. FIG. 1 shows that a malicious third party C intervenes between a source A and a destination B in an ad-hoc radio communication system 10, without both parties noticing this intervention. Despite parties A and B believe that a communication path is established between them directly as shown in FIG. 1(a), practically the third party may intervene between them as shown in FIG. 1(b). Now it will be described how the Man-in-the-middle attack is performed by way of a concrete example.

A common procedure for establishing a radio cipher communication path is as follows.

Procedure 1: The source makes a call to an unspecified number of parties using an ID of the destination it desires to communicate with.

Procedure 2: If the destination is located within the coverage area, it receives the ID (i.e., own ID).

Procedure 3: The destination communicates its operating conditions or the like to the source.

Procedure 4: Both parties determine the operating parameters together necessary for establishing a communication path (e.g., selection and setting of a communication path to be used, exchange of a cipher etc.).

Procedure 5: The communication path is established and mutual communication starts.

The timing when the malicious third party is most liable to intervene at the position C shown in FIG. 1 is the timing when both parties subject to wiretapping begin the radio communication face to face. That is, the intervention may occur during above listed procedures 1–3. FIG. 2 and FIG. 3 shows an example of methodology for a malicious third party to intervene at the position C shown in FIG. 1. According to the nature of the radio wave, the source A is forced to make a call to all surrounding destination candidates using a specific ID (procedure 1). The destination B listens for a call of its own ID (procedure 2), and responds to source A (procedure 3). At this moment, a malicious third party tries to make a pretense as mentioned below, by responding to a call to an ID other than its own or making a call using an ID other than its own. First of all, the malicious third party sends out a noise of the same frequency band against a response from destination B and hinders source A from listening for that response. At this moment, destination B does not know the fact of noise, so that it goes on to the procedure 4 and waits for the start of sessions from source A in the procedure 4. Since source A is not in the procedure 4, destination B returns to a condition again where it listens for a call of its own ID after the time-out. On the other hand, source A does not get a response from destination B, thus it usually makes a call using the same ID after the time-out (procedure 1). That is, source A and destination B try to synchronize the procedure each other, then they become aware of the failure by the time-out, then they return to the original conditions.

The malicious third party waits in tune with the timing when source A makes a call again using the same ID, and further waits in tune with the timing when destination B again starts listening for the call of its own ID. Thereafter, the malicious third party C responds to the call from source A by pretending destination B, and makes a call to destination B that starts listening for a call of its own ID by pretending source A. Of course, the malicious third party has a capability to change its own ID to any ID. The reason why the malicious third party can make such two pretense behavior is that the timing is not the same when source A and destination B return to the original conditions due to out of synchronization of the mutual procedure. This results from the fact that the timing when source A and destination B start waiting for a next event is originally different and that an event subject to the time-out is also different, hence the time-out period itself is different.

Due to this pretense maneuver, source A believes that it received a normal response from a proper destination B and proceeds with the malicious third party C on and after the procedure for establishing the communication path, i.e., procedure 4, while destination B believes that it received a call from a proper source A and proceeds with the malicious third party C as well. When proceeding to the procedure 5, the malicious third party can wiretap by relaying communication data between both parties, without coming to a knowledge of both parties A and B who want to secure the communication path by themselves. Utilizing this pretense (i.e., relay), a public key that source A is to send to destination B can be tampered with by the third party C and changed with a public key corresponding to a private key that the third party C prepared in advance. As a result, a cipher communication path that is essentially constructed between source A and destination B is only effective between source A and the third party C, while another communication path is established between the third party C and destination B by the third party C. That is, encrypted data sent from source A is decoded by the third party C, then it is transmitted over a cipher communication path between the third party C and destination B, with applying another encryption. The same applies to the reverse transmission. Despite both source A and destination B establish the cipher communication path in a normal procedure, they are changed their public key without knowing it, consequently wiretapped. Such an attack (i.e., wiretapping by pretense) is called Man-in-the-middle attack. Since the cipher communication path itself is safe, it is essential that both parties who communicate truly share the same public key, as a countermeasure against such an attack.

[Problems to be Solved by the Invention]

As a countermeasure against the-Man-in-the-middle attack, it is conceivable to display a personal ID (typically the name of an opponent) described in a certificate on the sending side and destination side to compare, using the certificate issued by a certification body. However, it costs to issue the certificate. Also, when utilizing a certification body, it is necessary to register one's identity for authentication, thus resulting in publishing own identity to an opponent, whereby anonymity can not be kept. Further, when utilizing a service such as Yellow Page that specifies a user from a public key, there is needed a secure network connection based on the phone line, for example, which costs for transaction.

SUMMARY OF THE INVENTION

Therefore, it is an aspect of the present invention to provide an ad-hoc radio communication verification system, ad-hoc radio communication data send/receive system, ad-hoc radio communication verification method, ad-hoc radio communication data send/receive method for effectively preventing tampering of data due to the pretense of a communication opponent, when sending and receiving data between the data sending and receiving devices that are mutually connected by an ad-hoc radio connection, and further a recording medium and delivery apparatus for recording and delivering a corresponding program, respectively.

It is another aspect of the invention to provide an ad-hoc radio communication verification system, ad-hoc radio communication data send/receive system, ad-hoc radio communication verification method, ad-hoc radio communication data send/receive method for verifying a communication opponent efficiently and smoothly, without exchange of passwords by parol or memo writing and without utilizing a certification body that publishes one's identity, and further a recording medium and delivery apparatus for recording and delivering a corresponding program, respectively.

BRIEF DESCRIPTION OF THE DRAWINGS

These and other aspects, features, and advantages of the present invention will become apparent upon further consideration of the following detailed description of the invention when read in conjunction with the following drawing figures:

FIG. 1 shows that a malicious third party C intervenes between a source A and a destination B, without both parties noticing this intervention.

DESCRIPTION OF THE SYMBOLS

Figure 2:
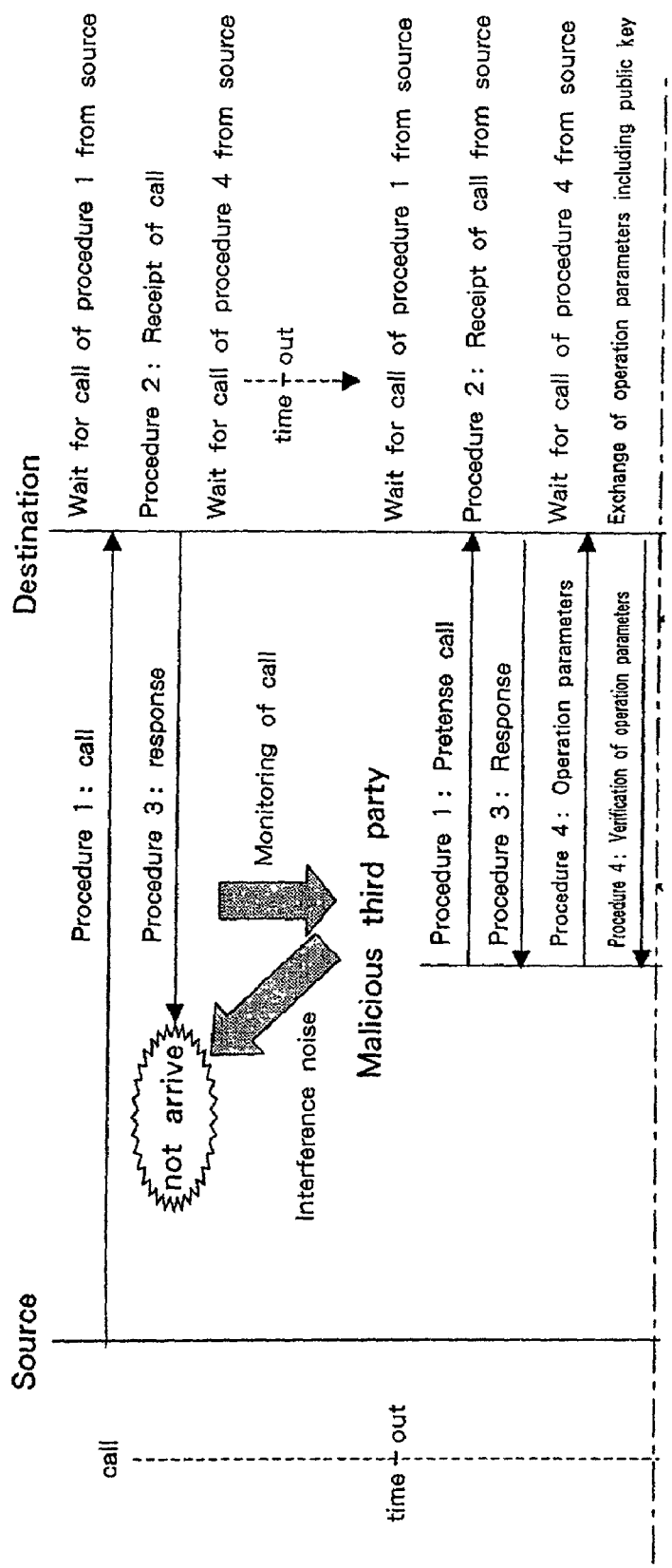
FIG. 2 shows the first part of an example of methodology for a malicious third party to intervene at the position C shown in FIG. 1.
Figure 3:
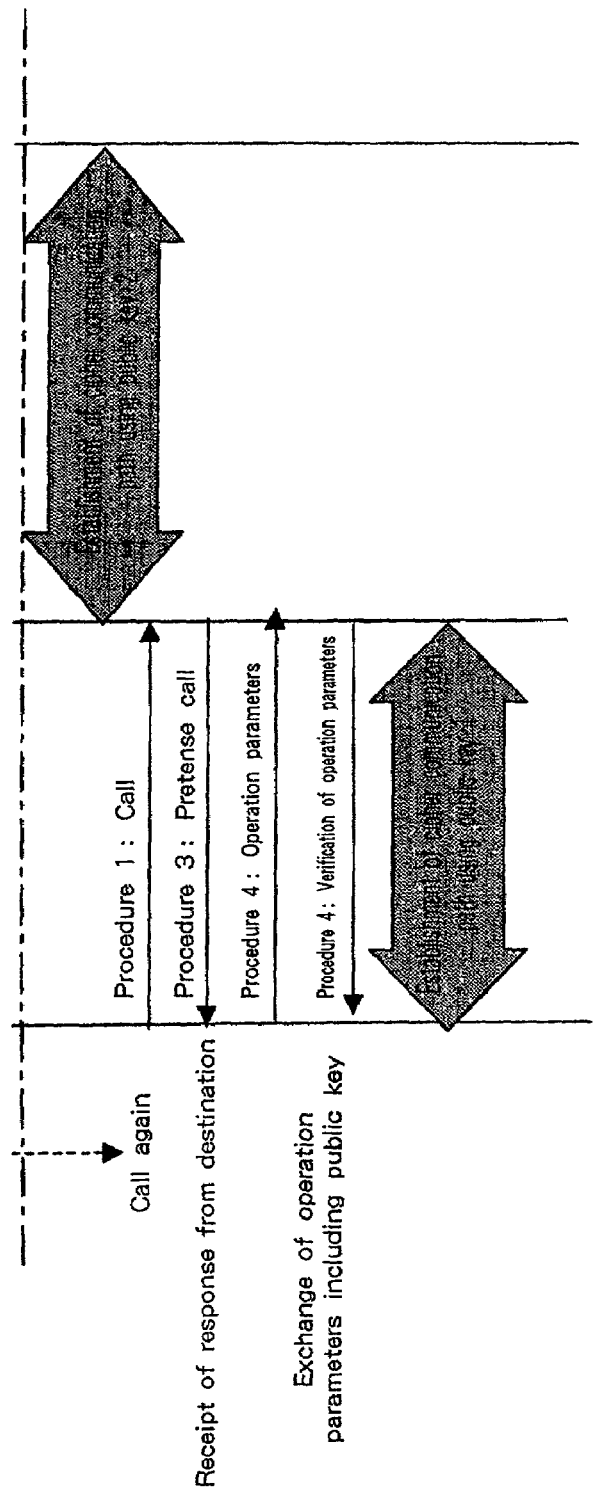
FIG. 3 shows the second part of an example of methodology for a malicious third party to intervene at the position C shown in FIG. 1.

10: Ad-hoc radio communication system 80a, 80b: PDA (Personal information terminal having radio communication function)

88a, 88b: Notebook computer (Personal computer having radio communication function).

DESCRIPTION OF THE INVENTION

According to the present invention, there is provided an ad-hoc radio communication verification system and method, respectively comprising the means or the steps of: sending data for verification data generation from one data send/receive device to the other send/receive device, wherein the two send/receive devices are mutually connected by an ad-hoc radio connection; in the one data send/receive device, generating verification data from the sent data for verification data generation based on a first generation algorithm and outputting the generated verification data to its own verification data output section; in the other data send/receive device, means for generating verification data from the received data for verification data generation based on the first generation algorithm and outputting the generated verification data to its own verification data output section; and determining whether the verification data at the verification data output sections of both the data send/receive devices matches mutually.

The distance between both the data send/receive devices is typically less than 10 m, preferably several meters, such that a user can come and go, since the verification data needs to be compared mutually at the verification data output sections of both the data send/receive devices. The verification data generated based on the data for verification data generation may be the data for verification data generation itself. The verification data is set such that it is easily determined whether the verification data at the verification data output section of both the send/receive devices matches mutually or not. Generally, if the verification software that is used in both the data send/receive devices is the same, the same generation algorithm is used to generate the verification data from the data for verification data generation. However, one of a plurality of generation algorithms may be determined at pleasure on the spot by both the data send/receive devices.

One data send/receive device generates verification data from the sent data for verification data generation based on the first generation algorithm. The other data send/receive device generates verification data from the received data for verification data generation based on the first generation algorithm. Then, it is determined whether the verification data output from the verification data output sections of both the data send/receive devices matches mutually. If affirmative, it shows that the data for verification data generation is properly transmitted from one data send/receive device to the other data send/receive device without tampered with on the way, that is, data integrity has been verified. In this way, data integrity is efficiently verified.

According to the ad-hoc radio communication verification system and method of the present invention, the verification data is visual or auditory verification data. The visual verification data includes an image, a numeric, a character, and a combination thereof. As an example of the visual display of verification data, when the verification data is total n bits of bit data, for example, n bits are divided into consecutive equal number of bits, then the histogram is created wherein the x-axis represents to the divisions, while the y-axis represents the quantity corresponding to each division. As an example of the auditory display of verification data, a sound with a pitch corresponding to each division of the aforementioned histogram is output in order from the lower division. The verification data should be selected such that a user can smoothly and correctly determine whether the verification data in both the data send/receive devices matches or not.

According to the ad-hoc radio communication verification system of the present invention, the verification data is output at the verification data output section both in the visual form and auditory form.

There may be a case where the difference of the verification data is apparent in the auditory output form in both the data send/receive devices, even if the visual output form of the verification data is similar, and vice versa. Accuracy of determination of match or mismatch is improved by comparing the verification data both in the visual output form and in the auditory output form.

The ad-hoc radio communication verification system and method of the present invention further comprise the means or steps of: defining a function as an operator, a numeric on which the operator operates as an input of the operator, and an operation result of the operator as an output of the operator; establishing a serial sequence of operators that are composed of one or more of operators arranged in series, wherein the operators relate to the same or different one-way functions; and letting an input to the serial sequence of operators be the data for verification data generation and an output from the serial sequence of operators or a corresponding value be the verification data.

The one-way functions include a hash function, for example. The operators sequence defined above includes what includes only one operator. By associating a one-way function with the generation of verification data from the data for verification data generation, the difficulty for finding data for verification data generation from verification data increases, hence a likelihood decreases that a malicious third party tampers with data using spurious data similar to true data for verification data generation. It is noted that finding the data for verification data generation from verification data becomes more difficult in terms of calculated amount, when the length of the serial sequence of operators gets longer.

According to the ad-hoc radio communication verification system and method of the present invention, the first generation algorithm generates a plurality of verification data, wherein for each verification data, it is determined whether the verification data at the verification data output sections of both the data send/receive devices match mutually.

The likelihood that all the plurality of verification data are similar is very low. Accuracy of verification improves by generating a plurality of verification data and determining for each of them whether the verification data matches mutually at the verification data output sections of both data send/receive devices.

The ad-hoc radio communication verification system and method of the present invention further comprise the means or steps of: defining a function as an operator, a numeric the operator operates on as an input of the operator, and an operation result of the operator as an output of the operator; establishing a serial sequence of operators that are composed of two or more of operators arranged in series, wherein the operators relate to the same or different one-way functions; letting an input to the serial sequence of operators be the data for verification data generation and outputs of two or more of operators selected from all operators composing the serial sequence of operators or corresponding values be the verification data respectively; and determining for each verification data whether the verification data match mutually at the verification data output sections of both the data send/receive devices.

The ad-hoc radio communication verification system and method of the present invention further comprise the means or steps of: defining a function as an operator, a numeric on which the operator operates as an input of the operator, and an operation result of the operator as an output of the operator; establishing a plurality of operators that relate to mutually different one-way functions; letting the data for verification data generation be a common input to each operator and an output of each operator or a corresponding value be the verification data respectively; and determining for each verification data whether the verification data match mutually at the verification data output sections of both the data send/receive devices. According to the ad-hoc radio communication verification system and method of the present invention, the data for verification data generation is a public key of either data send/receive device.

If the data for verification data generation is a public key of one data send/receive device, the other data send/receive device can verify that the received public key is the public key of the one data send/receive device from the verification data. Therefore, the cipher communication between both data send/receive devices is established completely using a symmetric key, for example, by sending the symmetric key from the other data send/receive device to the one send/receive device by the cipher communication using the public key of the one data send/receive device.

According to an ad-hoc radio communication data send/receive system and method of the present invention utilizing the aforementioned ad-hoc radio communication verification system, the system includes a portable terminal having a radio communication function and a personal computer having a radio communication function that are owned by each user, wherein the portable terminal and personal computer of each user are connected by a secure communication path; when the ad-hoc radio communication verification system verifies that a public key Kp of one user is transmitted from the portable terminal of the one user to the portable terminal of the other user without being tampered with, the public key Kp is transmitted from the portable terminal to the personal computer of each user, then the personal computer of the other user generates a symmetric key Kc based on a second generation algorithm, while the personal computer of the one user generates the symmetric key Kc based on the second generation algorithm from information transmitted from the personal computer of the other user in cipher according to the public key; and thereafter both the personal computers send and receive data in cipher according to the symmetric key Kc.

According to an ad-hoc radio communication data send/receive system and method of the present invention utilizing the aforementioned ad-hoc radio communication verification system, the system includes a portable terminal having a radio communication function and a personal computer having a radio communication function that are owned by each user, wherein the portable terminal and personal computer of each user are connected by a secure communication path; when the ad-hoc radio communication verification system verifies that a public key Kp of one user is transmitted from the portable terminal of the one user to the portable terminal of the other user without being tampered with, the portable terminal of the other user generates a symmetric key Kc based on a second generation algorithm, while the portable terminal of the one user generates the symmetric key Kc based on the second generation algorithm from information transmitted from the portable terminal of the other user in cipher according to the public key, then the symmetric key Kc is transmitted from the portable terminal to the personal computer of each user; and thereafter both the personal computers send and receive data in cipher according to the symmetric key Kc.

According to an ad-hoc radio communication data send/receive system and method of the present invention, the system includes a portable terminal having a radio communication function and a personal computer having a radio communication function that are owned by each user, wherein the portable terminal and personal computer of each user are connected by a secure communication path; when it is verified that a public key Kp of one user is transmitted from the portable terminal of the one user to the portable terminal of the other user without being tampered with, the public key Kp is transmitted from the portable terminal to the personal computer of each user, then the personal computer of the other user generates a symmetric key Kc based on a second generation algorithm, while the personal computer of the one user generates the symmetric key Kc based on the second generation algorithm from information transmitted from the personal computer of the other user in cipher according to the public key; and thereafter both the personal computers send and receive data in cipher according to the symmetric key Kc.

According to an ad-hoc radio communication data send/receive system and method of the present invention, the system includes a portable terminal having a radio communication function and a personal computer having a radio communication function that are owned by each user, wherein the portable terminal and personal computer of each user are connected by a secure communication path; when it is verified that a public key Kp of one user is transmitted from the portable terminal of the one user to the portable terminal of the other user without being tampered with, the portable terminal of the other user generates a symmetric key Kc based on a second generation algorithm, while the portable terminal of the one user generates the symmetric key Kc based on the second generation algorithm from information transmitted from the portable terminal of the other user in cipher according to the public key, then the symmetric key Kc is transmitted from the portable terminal to the personal computer of each user; thereafter both the personal computers send and receive data in cipher according to the symmetric key Kc.

The secure communication path between a portable terminal having a radio communication function and a personal computer having a radio communication function of each user is established by mutual communication using a private key of each user, for example. A portable terminal having a radio communication function includes so-called PDA (personal digital assistant). A hidden computing (described later) is considered as an example of style where a businessman works. For hidden computing, it is desirable that personal computers having a radio communication function, such as a notebook computer, can mutually send and receive data without being tampered with. If it is verified that a public key Kp of one portable terminal having a radio communication function is transmitted to the other portable terminal having a radio communication function without being tampered with on the way, as a result of the comparison between the verification data at the verification data output sections of portable terminals, the personal computers having a radio communication function of both users take over that verification, thereafter the cipher communication can be smoothly performed between both the personal computers using the symmetric key Kc.

A program that is recorded or delivered by a recording media or a delivery system of the present invention comprises the steps of:

sending data for verification data generation from one data send/receive device to the other data send/receive device, wherein the two data send/receive devices are mutually connected by an ad-hoc radio connection; in the one data send/receive device, outputting verification data to its own verification data output section, wherein the verification data is generated based on a first generation algorithm from the sent data for verification data generation; in the other data send/receive device, outputting verification data to its own verification data output section, wherein the verification data is generated based on the first generation algorithm from the received data for verification data generation; and determining whether the verification data at the verification data output sections of both the data send/receive devices matches mutually.

Further, it is characterized in that the verification data is visual or auditory verification data.

It is still further characterized in that the verification data is output at the verification data output section both in the visual form and auditory form.

The program that is recorded or delivered by a recording media or a delivery system of the present invention further comprises the steps of:

defining a function as an operator, a numeric on which the operator operates as an input of the operator, and an operation result of the operator as an output of the operator; establishing a serial sequence of operators that are composed of one or more of operators arranged in series, wherein the operators relate to the same or different one-way functions; letting an input to the serial sequence of operators be data for verification data generation and an output from the serial sequence of operators or a corresponding value be verification data.

It is further characterized in that the first generation algorithm generates a plurality of verification data, wherein for each verification data, it is determined whether the verification data at the verification data output sections of both the data send/receive devices match mutually.

Advantageous Embodiment

Now an example embodiment of the present invention will be described referring to the attached drawings.

Figure 4:
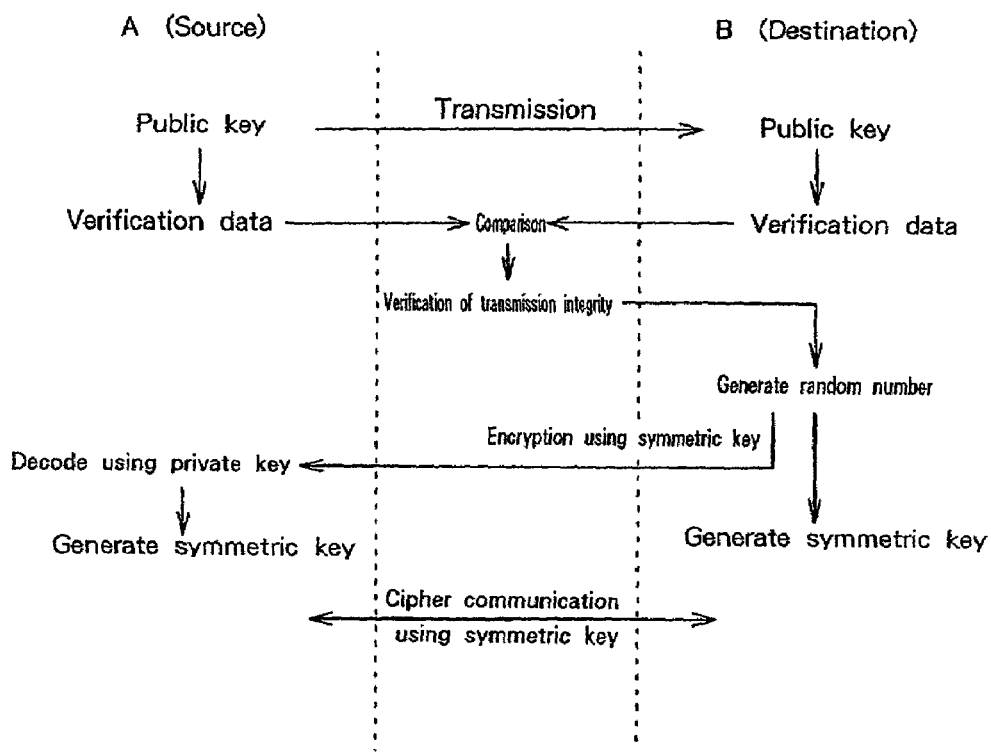
FIG. 4 is a flowchart illustrating the verification of data integrity and subsequent cipher data transmission.

FIG. 4 is a flowchart illustrating the verification of data integrity and subsequent cipher data transmission. A requester and the requested end of the establishment of cipher communication are defined as a source and destination respectively, wherein the source data send/receive device is shown as A, while the destination data send/receive device is shown as B in FIG. 4. The source and destination of a public key for verification of data integrity do not necessarily match the source and destination of a main transmission (i.e., cipher transmission using a symmetric key) after the verification of data integrity, so that the inverse relation may be allowed. Furthermore, during the main transmission, the source and destination may be properly changed.

Now, the procedure shown in FIG. 4 will be described in order.

(a) Source A sends to destination B its own public key Kp and an ID (hereinafter called "ID1") that specifies a verification data generation algorithm, along with a request for establishment of a cipher communication path. At the same time, source A generates verification data Xp based on its own public key Kp.
  (b) Let data that destination B received from source A for a public key Kp be Kx. If there is no tampering of data on the radio communication path from source A to destination B, Kx equals Kp, while if there is tampering, Kx differs from Kp. Destination B generates verification data Xx based on Kx received from source A using the generation algorithm corresponding to ID1 specified by source A. An example of verification data will be described referring to FIG. 5.
  (c) Users of source A and destination B verify whether verification data Xp and Xx that are displayed in the respective displays are the same. If Xp equals Xx, this means Kx equals Kp, hence it is determined that data integrity is assured for the communication path between source A and destination B.
  (d) Destination B encrypts the random number R for generating a symmetric key and an ID (hereinafter called "ID2") that specifies a symmetric key generation algorithm and sends them to source A. The transmission of ID2 between source A and destination B may be omitted like ID1, if ID2 is fixed such as when source A and destination B use the same communication software. At the same time, destination B generates a symmetric key Kc using the symmetric key generation algorithm.
  (e) Source A decodes a random number R received from destination B using a private key corresponding to the public key Kp to get the random number R and ID2, then generates a symmetric key Kc from the random number R using the symmetric key generation algorithm specified by ID2.
  (f) Thereafter, source A and destination B send and receive data by means of cipher communication based on the symmetric key Kc.

Figure 5:
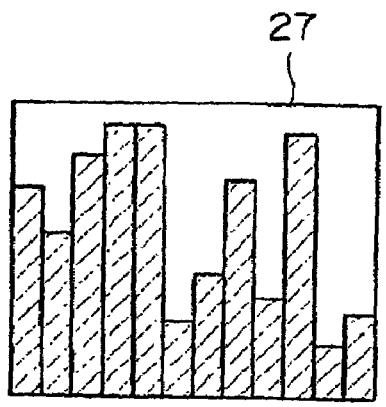
FIG. 5 is a histogram showing an example of verification data generated from data for verification data generation.
Figure 10:
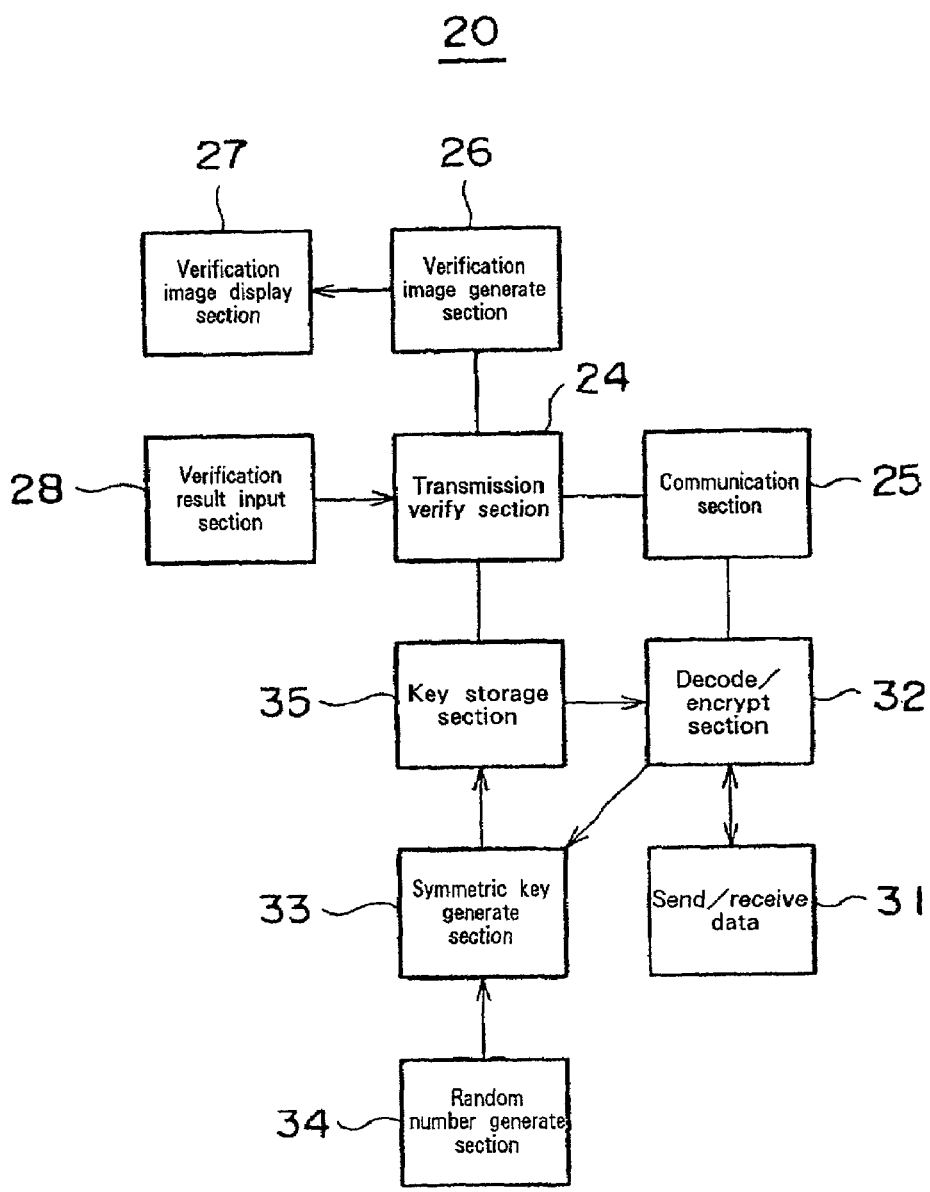
FIG. 10 is a block diagram of a data send/receive device 20.

Verification data displayed in the verification data output sections of source A and destination B may be the data for verification data generation itself, for example, the public key of source A itself. That is, the public key of source A may be displayed in bits as the data for verification data generation. Alternatively, the numeric representation of the public key may be transformed into an image representation to facilitate the comprehension. FIG. 5 is a histogram showing an example of verification data generated from data for verification data generation. The verification data is displayed in the verification image display section 27 of the data send/receive device 20 (FIG. 10). Assuming that the data for verification data generation is a public key of source A, and the public key is divided into a plurality of divisions having an equal number of bits in order, from MSB toward LSB, then the verification data is represented by the histogram, wherein the horizontal axis represents the divisions, while the vertical axis represents the quantity corresponding to each division. If the public key Kp of source A is not pretended by a malicious third party on the way of the transmission line, the data for verification data generation Kx that destination B received from source A equals the data for verification data generation Kp, i.e., Kx=Kp. Therefore, when a user of source A and destination B or any other reliable verifier directly watches the display section of source A or destination B and ascertains that Xp and Xx match each other as a result of comparison, he determines that the public key of source A was transmitted to destination B as it is, that is, the data integrity is assured. On the other hand, when Xp and Xx do not match, it is determined that there was tampering of data on the way of transmission line from source A to destination B.

However, since the accuracy of recognition capability of human beings is not necessarily high, there may be a case where the difference from a similar public key having a small hamming distance could not be detected only by generating a comparative image, such as a histogram shown in FIG. 5. Therefore, it might be effective to apply a one-way function such as a hash function to the public key to transform into a predetermined data and display it as a verification image such as a histogram. In this case, even if a third party who tries to make a pretense seeks for another public key that outputs similar data, such an attempt is impossible in terms of calculated amount since he must solve a discrete logarithmic problem. However, information amount of the created verification image is extremely small compared with a bit size of a public key, it may be breached by a complete search. Under such conditions, it might be effective to apply a further one-way function to data that has already been applied a one-way function to calculate new data, or apply another one-way function to a public key to calculate new data, thereby generating a verification image. A plurality of verification images are generated by repeating this operation, as a result, the resistance to pretense is improved.

Verification data is not limited to an image such as a histogram, it may be a display of character data, a change of tonal scales, or a combination thereof. For auditory verification data, a vertical axis of the histogram of FIG. 5 corresponds to the pitch of sounds or the tone, while the horizontal axis represents sounds corresponding to a value of each division in order for every predetermined time.

Further, the verification data may be output using both a visual display and an auditory speaker.

Figure 6:
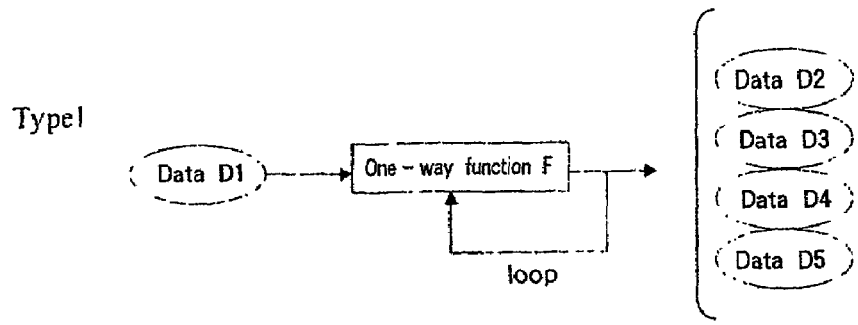
FIG. 6 shows the first method to generate verification data from data for verification data generation using a one-way function.
Figure 7:
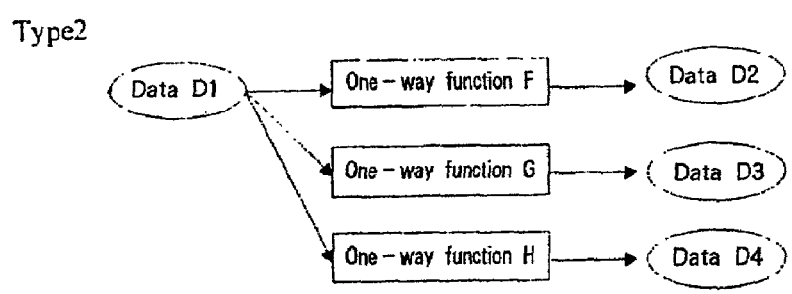
FIG. 7 shows the second method to generate verification data from data for verification data generation using a one-way function.
Figure 8:
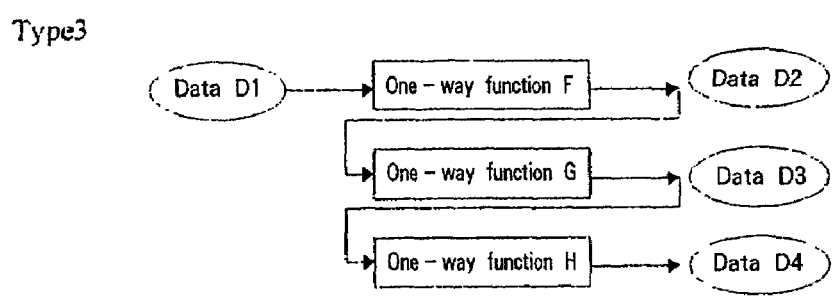
FIG. 8 shows the third method to generate verification data from data for verification data generation using a one-way function.

FIG. 6 through FIG. 8 show how to generate verification data from the data for verification data generation using a one-way function. Data D1 refers to data for verification data generation, while data D2, D3 and D4 refer to mean verification data. Each one-way function functions as an operator, which operates upon an input and outputs an operation result. A one-way function may be a hash function, for example.

In FIG. 6, a one-way function F is operated on data D1 to get data D2 at the first time, wherein D1 is data for verification data generation. At the second time, the same one-way function F is operated on data D2 to get data D3, that is, a loop including a one-way function F is formed. Thereafter, a loop processing is repeated to get data D4, D5, etc. After a predetermined number of repeats, a final operation result Dn is obtained, which is made the verification data and displayed in the verification image display section 27 of the data send/receive device 20 (see FIG. 10). In addition to the final operation result Dn, some or all of operation results D2, D3, D4, etc., may be displayed in the verification image display section 27 of the data send/receive device 20 for comparison, utilizing screen separation or time division. By comparing a plurality of verification data, even if one of them is confusing to determine match or mismatch, it is very unlikely that all of them are confusing to determine match or mismatch, thereby improving the accuracy of verification in relation to data tampering.

When comparing not all of D2, D3, D4, etc., but only specific some of them, the protection against a malicious third party is improved by changing a subset of them properly.

In FIG. 7, a plurality of different one-way functions F, G, H, etc. are provided to operate on common data D1 to get each operation result D2, D3, D4, etc. Specific some or all of D2, D3, D4, etc., are displayed as verification data for comparison in the verification image display section 27 of the data send/receive device 20 by means of screen separation or time division.

In FIG. 8, a plurality of different one-way functions F, G, H, etc., are provided. At the first time, a one-way function F is operated on data D1 to get data D2, wherein D1 is data for verification data generation. At the second time, a one-way function G is operated on data D2 to get data D3. Like this, a subsequent one-way function is operated on the previous operation result to get a plurality of D2, D3, D4, etc. Specific some or all of D2, D3, D4, etc., are displayed as verification data for comparison in the verification image display section 27 of the data send/receive device 20 by means of screen separation or time division. It is noted that the method for comparing a plurality of verification data shown in FIG. 6 is regarded as a specific example of FIG. 8, where the same one-way function F is used in place of different one-way functions.

Figure 9:
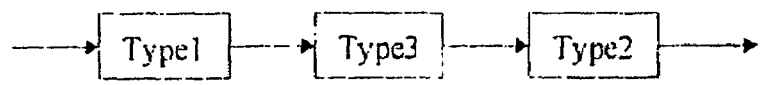
FIG. 9 is a block diagram showing a method for getting verification data by combining the processing of FIG. 6 to FIG. 8.

FIG. 9 is a block diagram showing a method for getting verification data by combining the processing of FIG. 6 through FIG. 8, wherein the operation type of verification data is defined as type 1, type 2 and type 3, respectively. The data for verification data generation is input to the far left of FIG. 9, while the verification data is output from the far right of FIG. 9. An arrangement shown in FIG. 9 is no more than an example and the data for verification data generation is obtained by selecting two or more of types from type 1, 2 and 3 and arranging them in any order.

FIG. 10 is a block diagram of the data send/receive device 20. Since the data send/receive device 20 becomes source A or destination B according to circumstances, it provides for both configurations for source and destination at the same time. When the data send/receive device 20 is source A, the transmission verify section 24 outputs its own public key to the verification image generate section 26, while when the data send/receive device 20 is source B, a public key of source A, which is received at the communication section 25 as send/receive data 31 from source A, is sent to the verification image generate section 26 via the transmission verify section 24. The verification image generate section 26 generates verification data from the public key received from the transmission verify section 24, wherein the generated verification data is displayed in the verification image display section 27. A user of source A and destination B compares the verification data in the verification image display section 27 of two data send/receive devices 20 that are connected via ad-hoc radio connection to check match or mismatch, then inputs the result to the verification result input section 28. The input result is then informed to the transmission verify section 24, wherein the transmission verify section 24 determines that the public key transmitted from source A to destination B via the transmission line for ad-hoc radio connection is secured its data integrity when informed that both the verification data matches. Next, when the data send/receive device 20 is source B, a random number is generated in the random number generate section 34, then a symmetric key is generated from the random number based on the symmetric key generation algorithm of ID2 in the symmetric key generate section 33. On the other hand, the random number generated in the random number generate section 34 and ID2 are encrypted based on the public key of source A in the decode/encrypt section 32, then the cipher data Dc is transmitted to source A via the send/receive data 31. The symmetric key generated based on the symmetric key generation algorithm of ID2 is stored in the key storage section 35. When the data send/receive device 20 is source A, the send/receive data 31 of cipher data Dc transmitted from destination B is decoded using own private key in the decode/encrypt section 32 to get the random number R and ID2, then the symmetric key is generated from the random number R based on the symmetric key generation algorithm of ID2 and stored in the key storage section 35. Subsequently, when sending data, the symmetric key is retrieved from the key storage section 35, then the send data is encrypted based on the symmetric key in the decode/encrypt section 32 and sent to the opponent as the send/receive data 31. When receiving data, the encrypted send/received data 31 received is decoded in the decode/encrypt section 32, then the plain data may be stored in a hard disk (not shown) or a predetermined processing may be performed.

Figure 11:
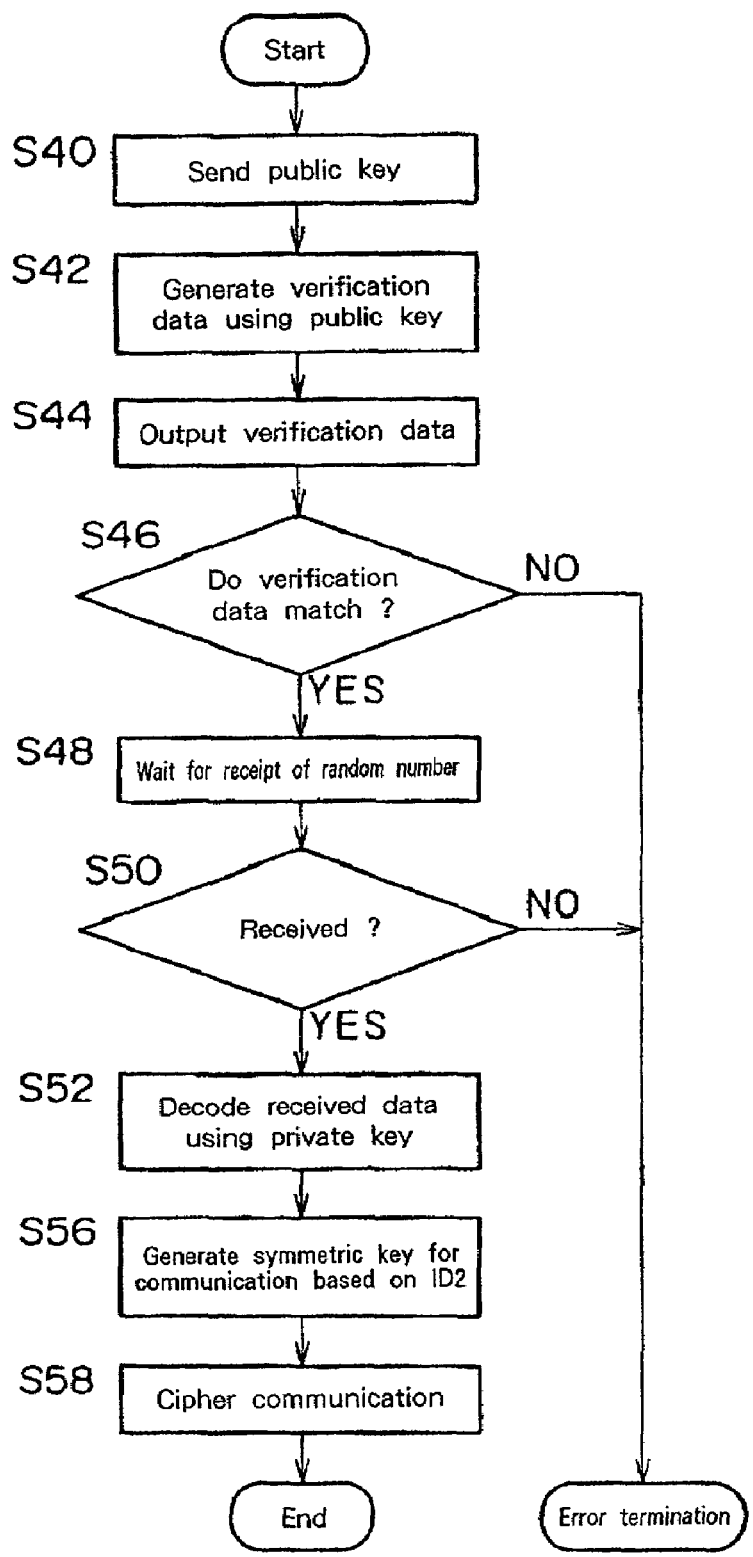
FIG. 11 is a flowchart of communication processing on the side of source A.

FIG. 11 is a flowchart of communication processing on the side of source A. First, it sends a public key Kp (step 40), then generates verification data Xp from the public key Kp based on the verification data generation algorithm of ID1 (step 42), and displays the verification data Xp in the verification image display section 27 (step 44). In step 46, own verification data Xp is compared with verification data Xx of destination B, as a result, if the comparison matches, the process proceeds to step 48, while mismatches, the process is terminated for error (i.e., data integrity is not secured). If data integrity is secured, the process waits for receipt of the random number R from destination B (step 48). If it is determined that the random number R is received in step 50, the process proceeds to step 52, while the process is terminated when the random number R has not been received despite a predetermined time has passed. In step 52, cipher data of the random number R from the destination B is decoded using own private key corresponding the public key Kp to get the random number R. It should be noted that between the data send/receive devices A and B, an ID is arranged in advance for each of a plurality of symmetric key generation algorithms, wherein an ID (e.g., ID2 in this example) that was employed at destination B as a symmetric key generation algorithm is transmitted to source A from destination B along with the random number R. In step 56, a symmetric key for communication with destination B is generated from the random number R based on a symmetric key generation algorithm of ID2, thereafter, cipher communication starts with destination B using the symmetric key (step 58).

Figure 12:
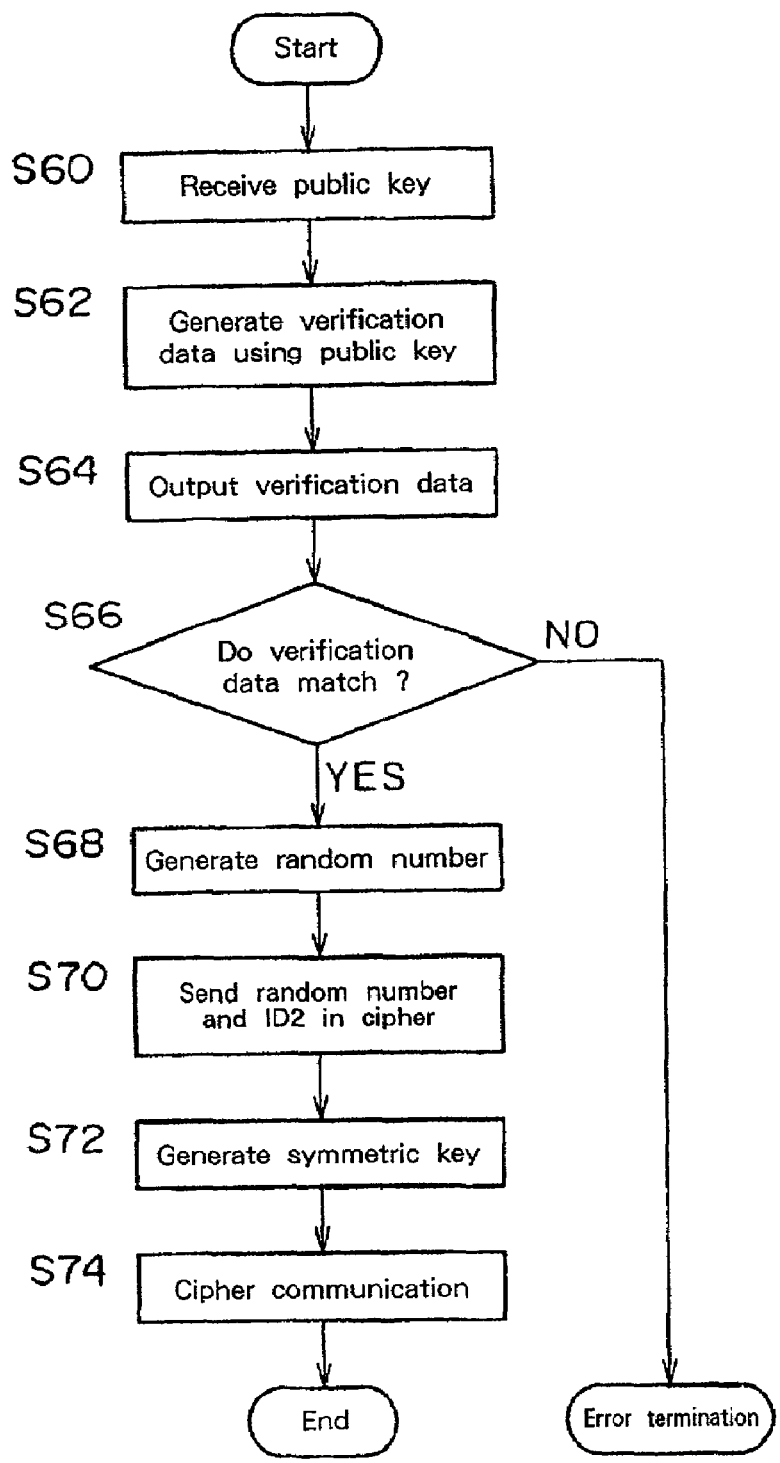
FIG. 12 is a flowchart of communication processing on the side of destination D.

FIG. 12 is a flowchart of communication processing on the side of destination B. First, it receives a public key Kx (step 60). Note that this received public key is referred to as Kx rather than Kp here, because it might be tampered with by a malicious third party intervening on the transmission line between source A and destination B. Next, verification data Xx is generated from Kx based on the verification data generation algorithm specified by ID1 that was sent from source A with a public key Kp (step 62), then the verification data Xx is output to the verification image display section 27 (step 64). In step 66, own verification data Xx is compared with verification data Xp of source A, as a result, if the comparison matches, the process proceeds to step 68, while mismatches, the process is terminated for error (i.e., data integrity is not secured). If data integrity is secured, a random number R is generated (step 68), then the random number R and ID2, which is the ID of the symmetric key generation algorithm selected among a plurality of symmetric key generation algorithms this time, are encrypted using a public key of source A and transmitted to source A (step 70), then the symmetric key Kc is generated based on the symmetric key generation algorithm of ID2 (step 72), thereafter, cipher communication starts with source A using the symmetric key (step 74).

Figure 13:
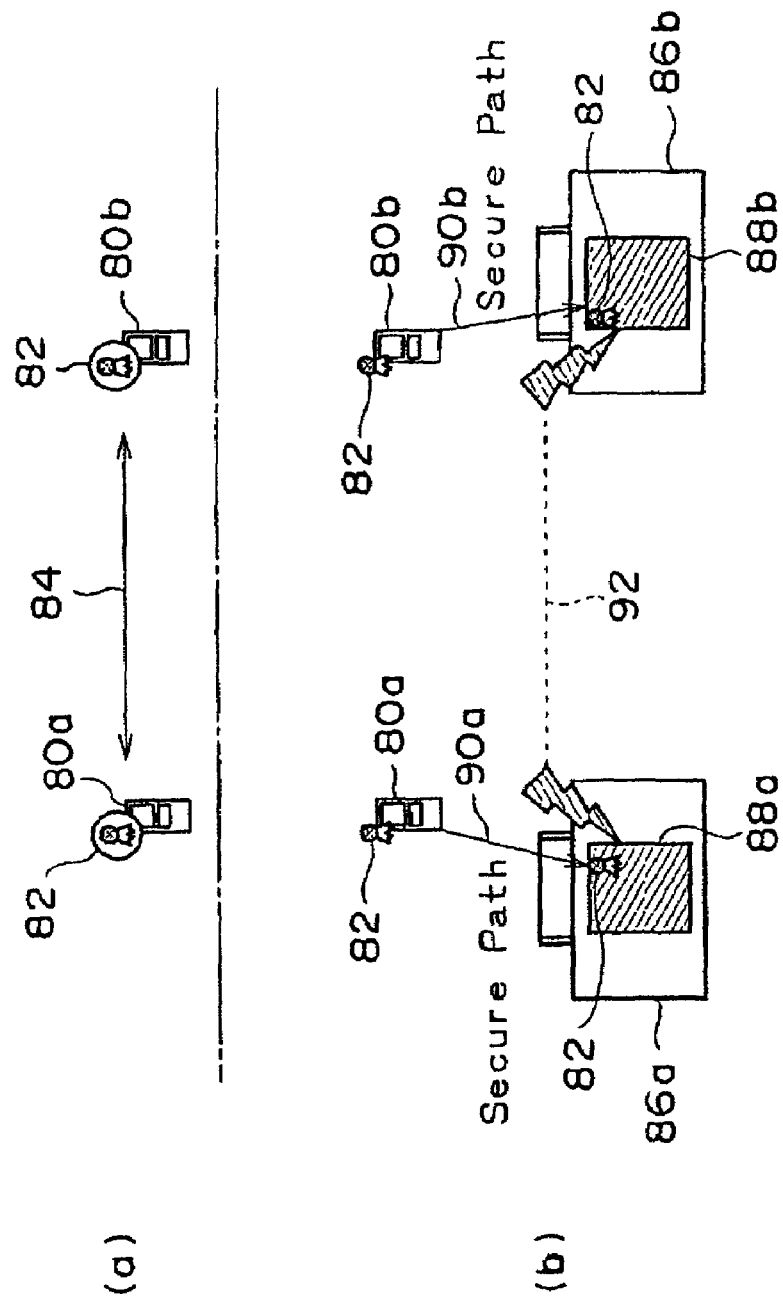
FIG. 13 is a diagram for illustrating how to establish a cipher communication path for an ad-hoc radio connection between users who utilize a hidden computing style.

FIG. 13 is a diagram for illustrating how to establish a cipher communication path for an ad-hoc radio connection between users who utilize a hidden computing style. The hidden computing means the utilization style where a user puts a computer in a bag and operates it by remote control 26 using a radio communication from a portable device such as PDA (personal digital assistant) on hand. A reference number 82 is a communication device that is equipped in the PDA 80a. When performing ad-hoc radio communication between the devices (i.e., notebook computers 88a and 88b in bags 86a and 86b, respectively) which are not equipped with a system that can verify the data integrity of a public key as described above, a cipher communication path is established indirectly using PDAs 80a and 80b, which maintain secure communication paths 90a and 90b in advance with notebook computers 88a and 88b that mount a cipher communication path establishment protocol. A secure communication path between a PDA and a notebook computer is established by means of, for example, cipher communication using a symmetric key that is arranged in advance between both parties. In FIG. 13, first in the procedure (a), a communication path 84 is established between PDA 80a and PDA 80b, then a public key of one PDA is transmitted to the other PDA to verify data integrity of the public key. Next, in the procedure (b), verification of data integrity between PDA 80a and PDA 80b is inherited to the notebook computers 88a and 88b, which are connected with PDAs 80a and 80b respectively by means of a secure communication paths 90a and 90b. Specifically, this inheritance is achieved by transmitting a public key, which is verified of its data integrity between PDAs 80a and 80b, to notebook computers 88a and 88b via secure communication paths 90a and 90b. Thereafter, notebook computers 88a and 88b share a symmetric key via communication path 92, then send and receive data in cipher according to the symmetric key.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. An ad-hoc radio communication verification system, comprising:
    a section sending data for verification data generation from a first data send/receive device to a second send/receive device, wherein the two send/receive devices are mutually connected by an ad-hoc radio connection;
    in the first data send/receive device, a section generating verification data from the sent data for verification data generation produced using a first generation algorithm, for outputting the generated first verification data to a first verification data output section and for communicating said first verification data to said second data send/receive device;
    in the second data send/receive device, a section generating verification data from the received data for verification data generation produced using the first generation algorithm, for outputting the generated second verification data to a second verification data output section and for communicating said second verification data to said first send/receive device; and
    a section at each of said first and second send/receive devices for determining whether the verification data at the first and second verification data output sections matches mutually,
    wherein the first generation algorithm generates a plurality of verification data, wherein for each verification data, it is determined whether the verification data at the first and second verification data output sections match mutually;
    a section establishing a serial sequence of operators that are composed of two or more of operators arranged in series, wherein the operators relate to the same or different one-way functions; and a section letting an input to the serial sequence of operators be the data for verification data generation and outputs of two or more of operators selected from all operators composing the serial sequence of operators or corresponding values be the verification data respectively;

and wherein said section determining for each verification data whether the verification data match mutually at the first and second verification data output sections comprises a section for comparing sequences of verification data.

2. An ad-hoc radio communication data send/receive system utilizing the ad-hoc radio verification system according to claim 1, comprising:

for each user, a portable terminal having a radio communication function and a personal computer having a radio communication function, wherein the portable terminal and personal computer of each user are, connected by a secure communication path; and wherein each portable terminal comprises a transmission section whereby a public key Kp of a first user is transmitted from the portable terminal of the first user to the portable terminal of a second user without being tampered with, as determined by the ad-hoc radio communication system, and the public key Kp is transmitted from the portable terminal to the personal computer of each user, and wherein each personal computer comprises a section to generate a symmetric key Kc such that the personal computer of the second user generates a symmetric key Kc produced using a second generation algorithm, while the personal computer of the first user generates the symmetric key Kc produced using the second generation algorithm from information including a random number and an identifier for the second generation algorithm transmitted from the personal computer of the second user in cipher using the public key and deciphered at said personal computer of the first user; and thereafter both the personal computers send and receive data in cipher using the symmetric key Kc.

3. An ad-hoc radio communication data send/receive system utilizing the ad-hoc radio communication verification system according to claim 1, comprising, for each user, a portable terminal having a radio communication function and a personal computer having a radio communication function that are owned by each user, wherein the portable terminal and personal computer of each user are connected by a secure communication path; when the ad-hoc radio communication verification system verifies that a public key Kp of the first user is transmitted from the portable terminal of the first user to the portable terminal of the second user without being tampered with, and wherein each personal computer comprises a section to generate symmetric key Kc such that the portable terminal of the second user generates a symmetric key Kc produced using a second generation algorithm, while the portable terminal of the first user generates the symmetric key Kc produced using the second generation algorithm from information transmitted from the portable terminal of the second user in cipher according to the public key and deciphered at the personal computer of the first user and transmits the symmetric key Kc from the portable terminal to the personal computer of each user; and thereafter, both the personal computers send and receive data in cipher using the symmetric key Kc.

4. An ad-hoc radio communication data send/receive system, comprising, for each user, a location comprising a portable terminal having a radio communication function and a personal computer having a radio communication function that are owned by each user, wherein the portable terminal and personal computer of each user are connected by a secure communication path; when it is verified that a public key Kp of a first user at a first location is transmitted from the portable terminal of the first user to a portable terminal of the second user at a second location without being tampered with by each of the locations verifying that first generated verification data generated at said first location matches second generated verification data generated at said second location, the public key Kp is transmitted from the portable terminal to the personal computer of each user, and wherein each personal computer comprises a section to generate a symmetric key Kc such that the personal computer of the second user generates a symmetric key Kc produced using a second generation algorithm, while the personal computer of the first user generates the symmetric key Kc produced using the second generation algorithm from information including a random number and an identifier for the second generation algorithm transmitted from the personal computer of the second user in cipher according to the public key and deciphered by the personal computer of the first user; and thereafter both the personal computers send and receive data in cipher using the symmetric key Kc.

5. An ad-hoc radio communication data send/receive system, comprising, for each user, a location comprising a portable terminal having a radio communication function and a personal computer having a radio communication function that are owned by each user, wherein the portable terminal and personal computer of each user are connected by a secure communication path; when it is verified that a public key Kp of a first user at a first location is transmitted from the portable terminal of the first user to the portable terminal of a second user at a second location without being tampered with by each of the locations verifying that first generated verification data generated at said first location matches second generated verification data generated at said second location, and wherein each personal computer comprises means to generate a symmetric key Kc such that the portable terminal of the second user generates a symmetric key Kc produced using a second generation algorithm, while the portable terminal of the first user generates the symmetric key Kc produced using the second generation algorithm from information transmitted from the portable terminal of the second user in cipher according to the public key and deciphered by the portable terminal of the first user, and transmits the symmetric key Kc from the portable terminal to the personal computer of each user; thereafter both the personal computers send and receive data in cipher using the symmetric key Kc.

6. A method for verifying an ad-hoc radio communication, comprising the steps of:

sending data for verification data generation from a first data send/receive device to a second send/receive device, wherein the two send/receive devices are mutually connected by an ad-hoc radio connection;

in the first data send/receive device, generating verification data from the sent data for verification data generation produced using a first generation algorithm and outputting the generated first verification data to a first verification data output section and communicating said first verification data to said second data send/receive device;

in the second data send/receive device, generating verification data from the received data for verification data generation produced using the first generation algorithm and outputting the generated second verification data to a second verification data output section and communicating said second verification data to said first send/receive device;

determining at each of said first and second send/receive devices whether the verification data at the first and second verification data output sections match mutually;

establishing a serial sequence of operators that are composed of more than one operators arranged in series, wherein the operators relate to the same or different one-way functions; and letting an input to the serial sequence of operators be the data for verification data generation and an output from the serial sequence of operators or a corresponding value be the verification data.

7. The method according to claim 6, wherein the verification data is visual or auditory verification data and wherein the verification data is output at at least one of the first and second verification data output sections both in the visual form and auditory form.

8. The method according to claim 6 further comprising: determining for each verification data whether the verification data match mutually at the verification data output sections of both the data send/receive devices.

9. The method according to claim 6, wherein the data for verification data generation is a public key of one of said first and said second data send/receive devices.

10. The method for sending and receiving ad-hoc radio communication data, utilizing the verification method according to claim 9, wherein each user has a portable terminal having a radio communication function for said each user and a personal computer having a radio communication function for the each user, wherein the portable terminal and personal computer of each user are connected by a secure communication path; and wherein the method further comprises, when the verification method verifies that a public key Kp of the first user is transmitted from the portable terminal of the first user to the portable terminal of the second user without being tampered with, transmitting the public key Kp from the portable terminal to the personal computer of each user; the personal computer of the second user generating a symmetric key Kc produced using a second generation algorithm; the personal computer of the first user generating the symmetric key Kc produced using the second generation algorithm from information including a random number and an identifier for the second generation algorithm transmitted from the personal computer of the second user in cipher according to the public key and deciphered by the personal computer of said first user; and both the personal computers sending and receiving data in cipher using the symmetric key Kc.

11. An article of manufacture comprising a computer usable medium having computer usable medium having computer readable program code embodied therein for causing ad-hoc radio communication, the computer readable program code in said article of manufacture comprising computer readable program code for causing a computer to effect the steps of claim 10.

12. The method for sending and receiving ad-hoc radio communication data, utilizing the verification method according to claim 9, wherein each user has a portable terminal having a radio communication function for each user and a personal computer having a radio communication function for each user, wherein the portable terminal and personal computer of each user are connected by a secure communication path; and wherein said method further comprises, when the verification method verifies that a public key Kp of the first user is transmitted from the portable terminal of the first user to the portable terminal of the second user without being tampered with, the portable terminal of the second user generating a symmetric key Kc produced using a second generation algorithm; the portable terminal of the first user generating the symmetric key Kc produced using the second generation algorithm from information transmitted from the portable terminal of the second user in cipher according to the public key and deciphered by the portable terminal of the first user; and transmitting the symmetric key Kc from the portable terminal to the personal computer of each user; and both the personal computers sending and receiving data in cipher using symmetric key Kc.

13. An article of manufacture comprising a computer usable medium having computer readable program code embodied therein for causing ad-hoc radio communication, the computer readable program code in said article of manufacture comprising computer readable program code for causing a computer to effect the steps of claim 6.

14. The method for sending and receiving ad-hoc radio communication data, wherein each user has a location comprising a portable terminal having a radio communication function for each user and a personal computer having a radio communication function for each user, wherein the portable terminal and personal computer of each user are connected by a secure communication path; and wherein said method further comprises, when it is verified that a public key Kp of the first user at a first location is transmitted from the portable terminal of the first user to the portable terminal of the second user at a second location without being tampered with by each of the locations verifying that first generated verification data generated at said first location matches second generated verification data generated at said second location, transmitting the public key Kp from the portable terminal to the personal computer of each user; the personal computer of the second user generating a symmetric key Kc produced using a second generation algorithm; the personal computer of the first user generating the symmetric key Kc produced using the second generation algorithm from information including a random number and an identifier for the second generation algorithm transmitted from the personal computer of the second user in cipher according to the public key and deciphered by the personal computer of the first user; and thereafter both the personal computers sending and receiving data, in cipher using the symmetric key Kc.

15. An article of manufacture comprising a computer usable medium having computer readable program code embodied therein for causing ad-hoc radio communication, the computer readable program code in said article of manufacture comprising computer readable program code for causing a computer to effect the steps of claim 14.

16. The method for sending and receiving ad-hoc radio communication data, wherein each user has a location comprising a portable terminal having a radio communication function for each user and a personal computer having a radio communication function for each user, wherein the portable terminal and personal computer of each user are connected by a secure communication path; and wherein said method further comprises, when it is verified that a public key Kp of the first user at a first location is transmitted from the portable terminal of the first user to the portable terminal of the second user at a second location without being tampered with by each of the locations verifying that first generated verification data generated at said first location matches second generated verification data generated at said second location, the portable terminal of the second user generating a symmetric key Kc produced using a second generation algorithm; the portable terminal of the first generating the symmetric key Kc produced using the second generation algorithm from information transmitted from the portable terminal of the second user in cipher according to the public key and deciphered by the portable terminal of the first user; transmitting the symmetric key Kc from the portable terminal to the personal computer of each user; and, thereafter both the personal computers sending and receiving data in cipher using the symmetric key Kc.

17. An article of manufacture comprising a computer usable medium having computer readable program code embodied therein for causing ad-hoc radio communication, the computer readable program code in said article of manufacture comprising computer readable program code for causing a computer to effect the steps of claim 16.

* * * * *